(12) United States Patent
Bates

(10) Patent No.: US 10,239,138 B1
(45) Date of Patent: Mar. 26, 2019

(54) RECIPROCATING SAW BLADE FOR PREPARING FISH

(71) Applicant: FilletZall Holdings, LLC, Kemah, TX (US)

(72) Inventor: Paul Bates, Kemah, TX (US)

(73) Assignee: FilletZall Holdings, LLC, Kemah, TX (US)

( * ) Notice: Subject to any disclaimer, the term of this patent is extended or adjusted under 35 U.S.C. 154(b) by 0 days.

(21) Appl. No.: 15/803,845

(22) Filed: Nov. 6, 2017

(51) Int. Cl.
| | |
|---|---|
| *A22C 25/00* | (2006.01) |
| *B23D 61/12* | (2006.01) |
| *A22C 25/16* | (2006.01) |
| *A22C 17/00* | (2006.01) |
| *B23D 51/10* | (2006.01) |

(52) U.S. Cl.
CPC ........ *B23D 61/123* (2013.01); *A22C 17/0033* (2013.01); *A22C 25/16* (2013.01); *B23D 51/10* (2013.01); *B23D 61/121* (2013.01)

(58) Field of Classification Search
CPC ................................. A22C 25/00; B23D 61/00
USPC ............. 83/835, 838, 846–855, 661; 30/369, 30/277.4, 166.3, 339, 517, 523, 355, 30/272.1, 392–394; 452/149, 102–105
See application file for complete search history.

(56) References Cited

U.S. PATENT DOCUMENTS

| | | | | |
|---|---|---|---|---|
| 566,865 | A * | 9/1896 | Morrish | |
| 3,307,259 | A * | 3/1967 | Christensen | B26B 7/005 279/23.1 |
| 4,907,344 | A * | 3/1990 | Hahn | B26B 9/02 30/355 |
| 6,108,915 | A * | 8/2000 | Verdier | B26B 9/02 30/355 |
| 6,119,571 | A * | 9/2000 | Hayden, Sr. | B23D 61/121 83/661 |
| D508,389 | S * | 8/2005 | Polk | |
| 7,536,793 | B1 * | 5/2009 | Richmond | A47G 21/14 211/70.7 |
| D617,162 | S * | 6/2010 | Tom et al. | |
| D693,186 | S * | 11/2013 | Hollinger | |
| 8,689,667 | B2 * | 4/2014 | Butzen | B23D 61/121 30/355 |
| 8,707,564 | B2 * | 4/2014 | Burch | B23D 51/01 30/155 |
| D730,709 | S * | 6/2015 | McDonough et al. | |
| D731,279 | S * | 6/2015 | McDonough et al. | |
| D745,351 | S * | 12/2015 | Tyner et al. | |

* cited by examiner

*Primary Examiner* — Richard T Price, Jr.
(74) *Attorney, Agent, or Firm* — Spradley PLLC; Michael Spradley

(57) ABSTRACT

This disclosure relates to a reciprocating saw blade for filleting and preparing fish. The reciprocating saw blade can comprise a blade and a wing. The blade can be attachable to a reciprocating blade. The blade can comprise a tip, a spine, a cutting edge and a heel. The spine can be at one side of the blade. The spine can have a concave form from the tip up to the middle side edge section of the blade and can form a straight edge from the middle section up to the rear side edge section of the blade. The cutting edge can have a continuous set of serrations formed through a tooth from a plurality of teeth. The cutting edge can comprise a grind that divides the spine and the cutting edge. The grind can taper from the middle section of the blade to the cutting edge.

15 Claims, 9 Drawing Sheets

RECIPROCATING SAW BLADE FOR PREPARING FISH

BACKGROUND

This disclosure relates to a reciprocating saw blade for filleting and preparing fish.

Traditionally, filleting and preparing fish can be done using a standard fillet knife. Fillet knives have thin flexible blade that allows better control when filleting fish. Such feature allows the blade to easily slide through fish meat. Such method can be effective when used for preparing minimal portions of small fish but can be time-consuming, tiresome, and repetitive once it is used for larger fish such as tuna, and or salmon. Another method for preparing fish involves using a double bladed knife. Double bladed knife can minimize the time in filleting the fish since it can be used to cut through both side of the fish at the same time. Thus, separating the fillets from the bones of the fish. However, such method can also damage the meat as it goes through the double bladed knife since the meat can be caught in between the two blades of the knife. Moreover, since meat can be caught in between the two blades, cleaning double bladed knife can be tedious.

As such it would be useful to have a reciprocating saw blade for filleting and preparing fish.

SUMMARY

This disclosure relates to a reciprocating saw blade for filleting and preparing fish. The reciprocating saw blade can comprise a blade and a wing. The blade can be attachable to a reciprocating blade. The blade can comprise a tip, a spine, a cutting edge and a heel. The spine can be at one side of the blade. The spine can have a concave form from the tip up to the middle side edge section of the blade and can form a straight edge from the middle section up to the rear side edge section of the blade. The cutting edge can have a continuous set of serrations formed through a tooth from a plurality of teeth. The cutting edge can comprise a grind that divides the spine and the cutting edge. The grind can taper from the middle section of the blade to the cutting edge. The heel can be at the rear end of the cutting edge. The wing can be at the rear end of the blade having an orifice and a prong. The orifice can be compatible to a quick-release mechanism of the reciprocating blade.

DETAILED DESCRIPTION

Described herein is a reciprocating saw blade for filleting and preparing fish. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
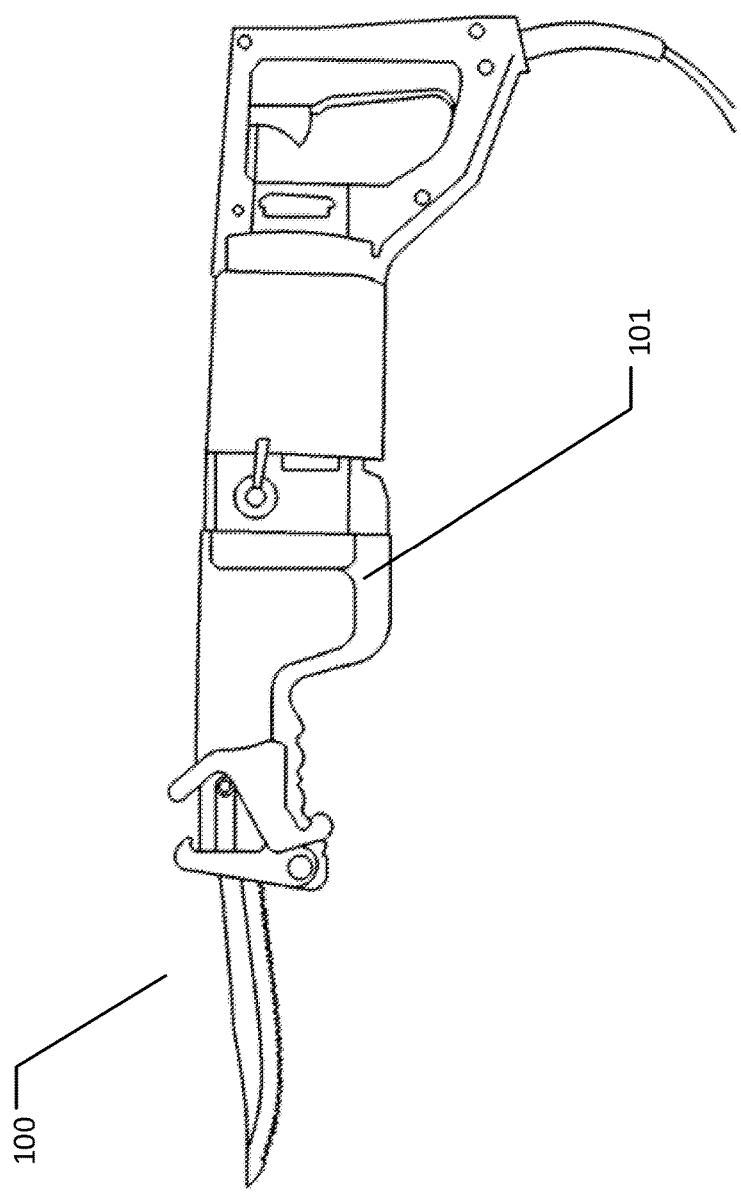
FIG. 1 illustrates a blade attached to reciprocating saw.

FIG. 1 illustrates a blade 100 attached to a reciprocating saw 101. Blade 100 can be a tool connectable to a portion of reciprocating saw 101. Blade 100 can be made of any durable material that can include but is not limited to carbon steel, stainless steel, and ceramic. Blade 100 can vary in length, and/or size. Blade 100 can be used to cut meat that can include but is not limited to fish, chicken, beef, and pork. Reciprocating saw 101 can be any type of saw that uses a push and pull reciprocating motion of blade 100 to cut meat. An example of reciprocating saw 101 can be a Sawzall.

Figure 2:
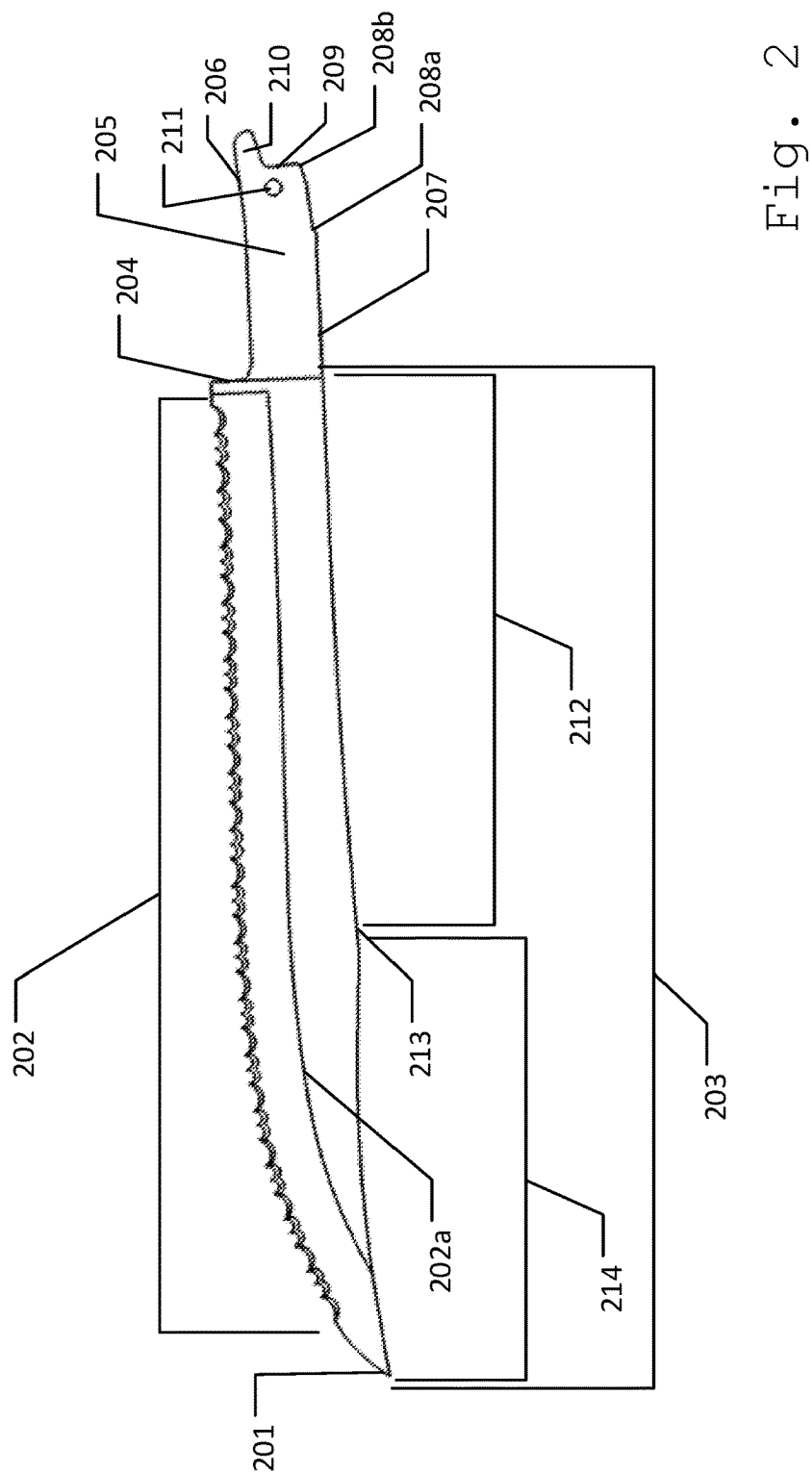
FIG. 2 illustrates a side view of a blade.

FIG. 2 illustrates a side view of blade 100. The main parts of blade 100 can comprise a tip 201, a cutting edge 202, a spine 203, a heel 204 and a wing 205. Cutting edge 202 can extend from tip 201 to heel 204. Cutting edge 202 can be the portion of blade 100 that is capable of cutting meat. Cutting edge 202 can comprise a grind 202a. Grind 202a can be the tapering part of blade 100, which divides cutting edge 202 and spine 203. Grind 202a starts from the middle portion of blade 100 that tapers towards cutting edge 202. Spine 203 can be the part of blade 100 that is at the opposite edge of cutting edge 202. Heel 204 can be an inward bend that perpendicularly connects the rear edge of cutting edge 202 with wing 205. Starting from the rear of spine 203, and heel 204, wing 205 can be the portion of blade 100 that extends outward. Moreover, wing 205 can be the portion of blade 100 that connects to reciprocating saw 101. Wing 205 can comprise a first wing edge 206, and a second wing edge 207. First wing edge 206 can be the edge that connects at the rear end of spine 203 while second wing edge 207 can be the edge portion of wing 205 that connects to heel 204 on cutting edge 202. First wing edge 206 can comprise a first sink point 208a and a second sink point 208b. Each sink point 208 can be the starting point wherein a slight drop or an inward line that is perpendicular to the first wing edge 206 is formed. In this structure, first wing edge 206 can form a straight edge from the rear end of spine 203 and then forms first sink point 208a. From the end point of first sink point 208a, first wing edge 2006 can continuously form a slanted line towards second sink point 208b. A perpendicular straight line 209 can be formed from second sink point 208b. The rear end of second wing edge 207 can form a prong 210 that extends outward of wing 205. Perpendicular straight line 209 can connect prong 210 with second sink point 208b.

The side surface of wing 205 can comprise an orifice 211 placed near the rear edge of wing 205. Orifice 211 can be a through-and-through hole placed on the side surface of wing 205. Wing 205 can be in various length, and shape.

In one embodiment, spine 203 can comprise a straight edge 212, a drop point 213, and a concave edge 214. Drop point 213 can be the end point of straight edge 212 and the starting point of concave edge 214. Drop point 213 can be at the middle side edge section of spine 203. Concave edge 214 can be a slightly curved portion on spine 203. In this structure, straight edge 212 can form from wing 205 up to drop point 213, then forms concave edge from drop point 213 up to tip 201. As such, tip 201 that can be formed through the intersection of spine 203 and cutting edge 202. In such structure, tip 201 can form a pointed and thinner tip for blade 100. Cutting edge 202 can form a straight edge from wing 205 then slopes inwardly about a quarter way through to tip 201. The entire cutting edge 202 can be serrated.

Figure 3:
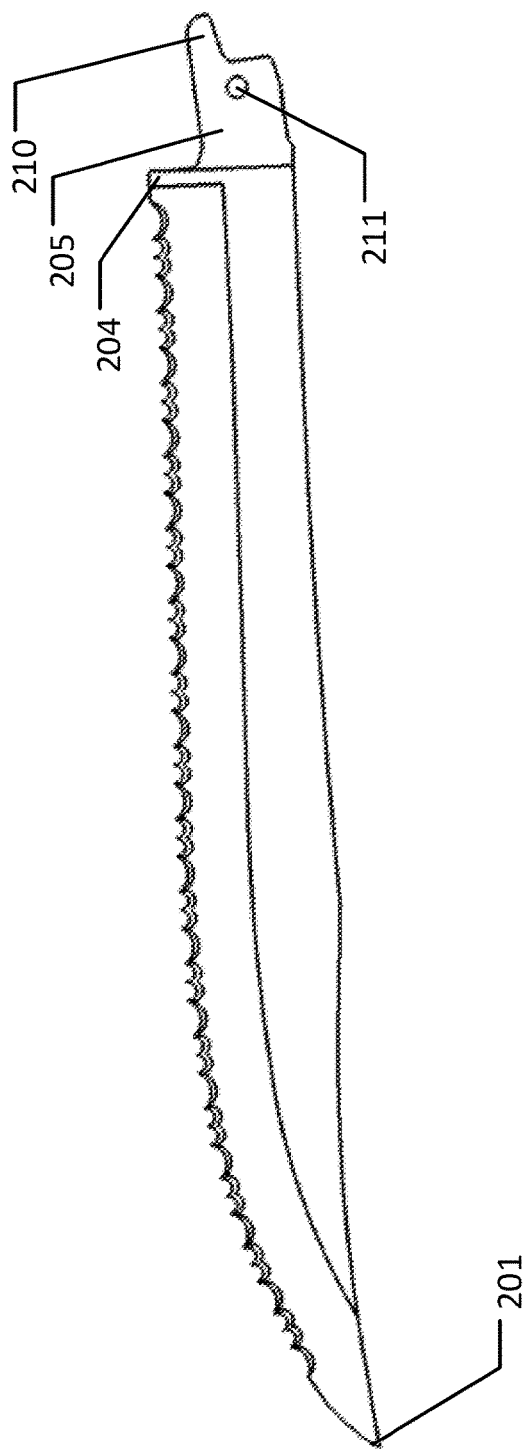
FIG. 3 illustrates an embodiment of a blade.

FIG. 3 illustrates an embodiment of blade 100. In one embodiment, blade 100 can be short. Blade 100 that is short can be used for deboning meats, and can be used in preparing small fishes. As a non-limiting example, the length of blade 100, which is from tip 201 to the rear end of prong 210 can be 8.61 inches. In another non-limiting example, the length from tip 201 to heel 204 can be 7.67 inches. As another non-limiting example, the length of wing 205, which is from heel 204 up to the rear end of prong 210 can be 0.94 inches. Further in another non-limiting example, the radius of orifice 211 can be 0.06. In one embodiment, short blade 100 can have a short wing 205. In another embodiment, short blade 100 can have a long wing 205.

Figure 4:
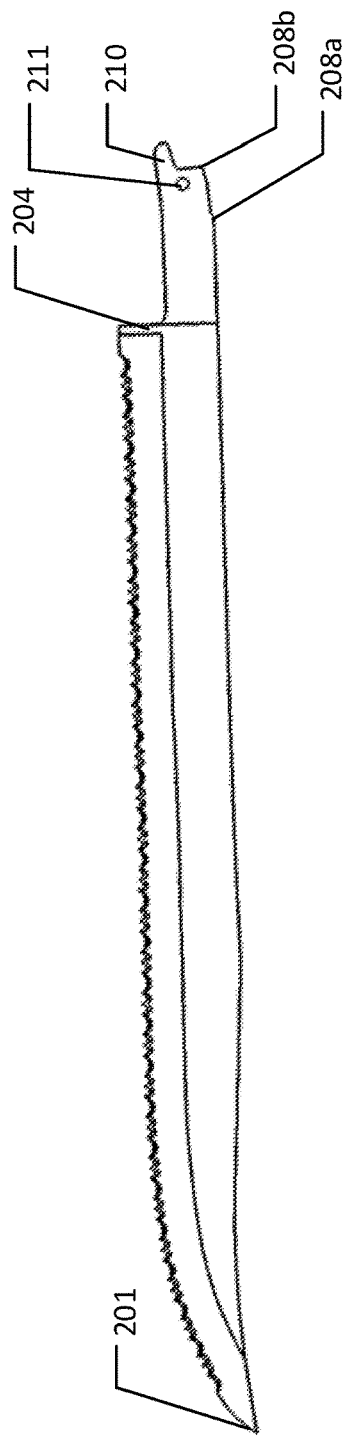
FIG. 4 illustrates another embodiment of a blade.

FIG. 4 illustrates another embodiment of blade 100. In one embodiment, blade 100 can be long. Blade 100 that is long can be used for preparing large fishes. As a non-limiting example, the length of blade 100, which is from tip 201 up to first sink point 208a can be 12.75 inches. In another non-limiting example, the length from tip 201 to heel 204 can be 11.75 inches. As another non-limiting example, the length from heel 204 up to first sink point 208a can be 1.00 inch, while the length from first sink point 208a up to the tip of prong 210 can be 0.90 inches. Further in another non-limiting example, the radius of orifice 211 can be 0.06. In one embodiment, long blade 100 can have a long wing 205.

Figure 5:
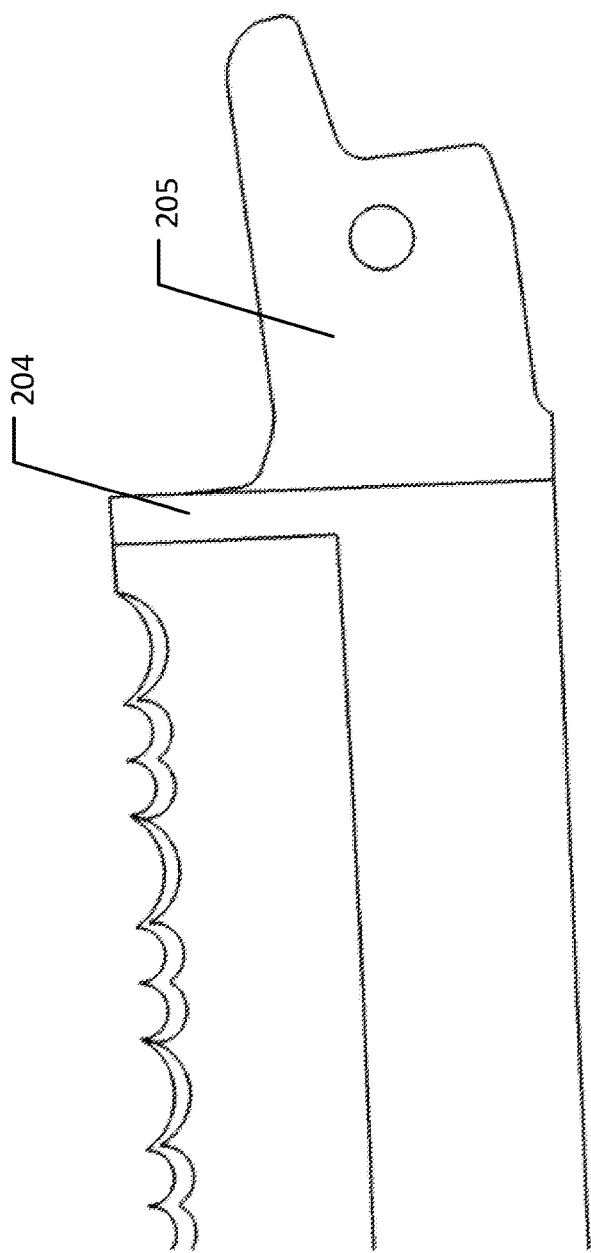
FIG. 5 illustrates an embodiment of a wing.

FIG. 5 illustrates an embodiment of wing 205. In this embodiment wing 205 can be short. As a non-limiting example, the length of short wing 205 that is from heel 204 up to the tip of prong 210 can be 0.94 inches.

Figure 6:
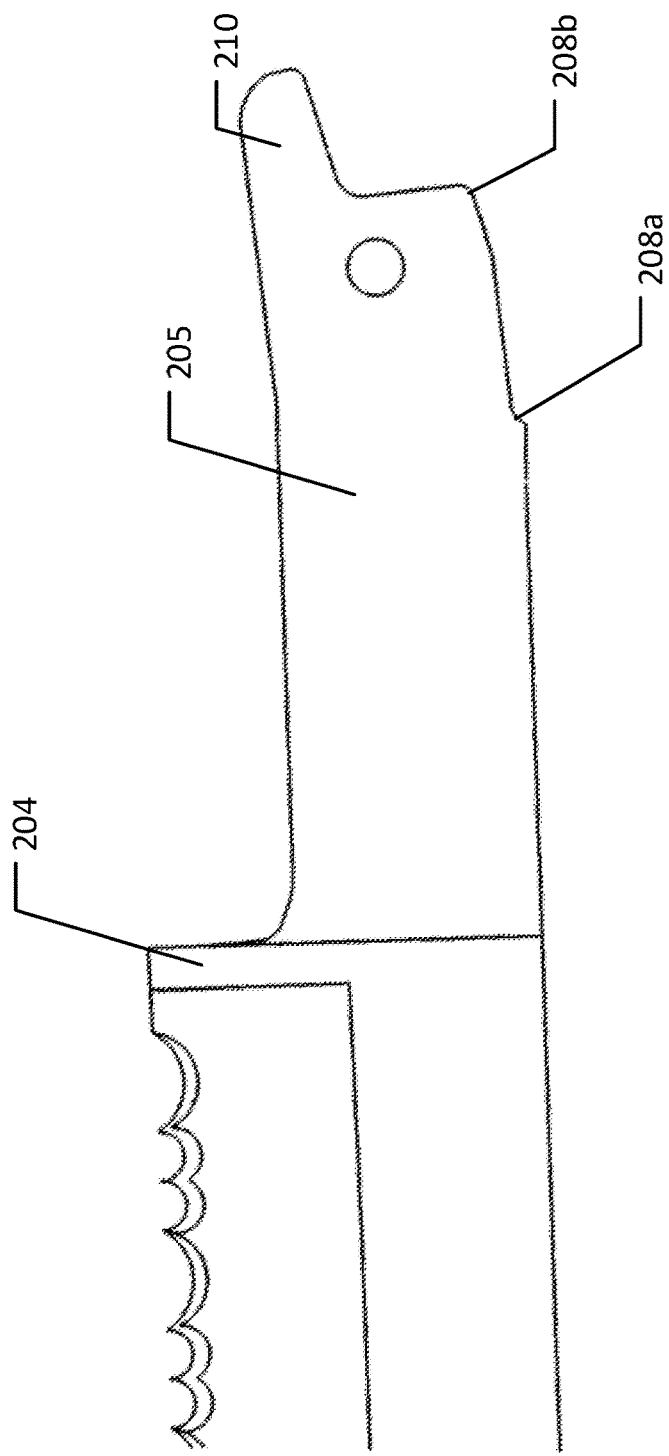
FIG. 6 illustrates another embodiment of a wing.

FIG. 6 illustrates another embodiment of wing 205. In this embodiment, wing 205 can be long. As a non-limiting example, the length of long wing 205 that is from heel 204 up to first sink point 208a can be 1.00 inch while the length from sink point 208a up to the tip of prong 210 can be 0.90 inches.

Figure 7:
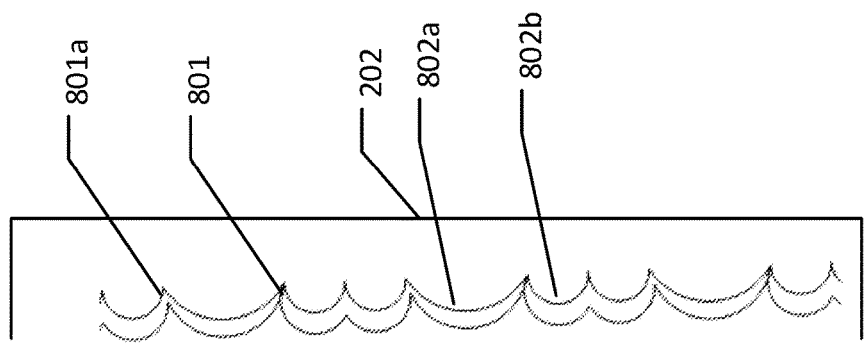
FIG. 7 illustrates a cutting edge comprising a plurality of teeth.

FIG. 7 illustrates cutting edge 202 comprising a plurality of teeth 801. Each tooth 801 can be separated through each of a plurality of valleys 802. Each tooth 801a can have an upward pointed tip. Cutting edge 202 can have continuous sets of serration formed through teeth 801. Each valley 802 can separate each tooth 801a, such that every three teeth 801 can be in between a pair of wide valleys 802a, while each of tooth 801a within said pair of wide valleys 802a can be separated by a narrow valley 802b.

Figure 8:
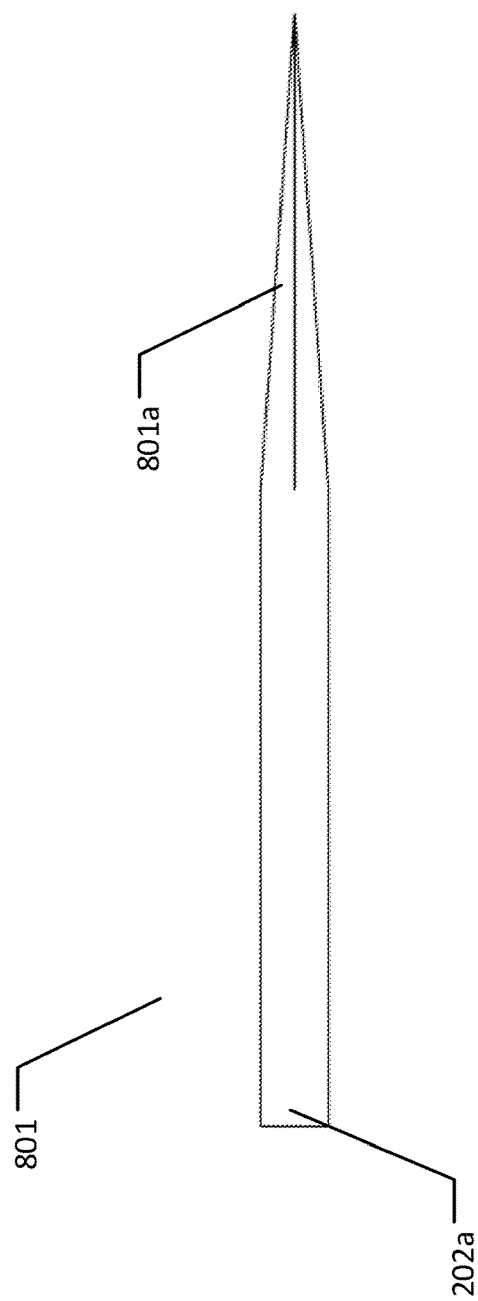
FIG. 8 illustrates a larger scale of a tooth.

FIG. 8 illustrates a larger scale of a tooth 801a. As a non-limiting example, the length from grind 202a up to the tip of tooth 801a can be 0.86 inches. Moreover, the height from grind 202a up to the base of tooth 801a can be 0.42 inches, while the length from the base of tooth 801a up to the tip of tooth 801a can be 0.44 inches. Additionally, the width of tooth 801a can be 0.60 inches. Furthermore, the pitch from the base of tooth 801a can be 8°, while the pitch from the middle portion of tooth 801a can be 4°.

Figure 9:
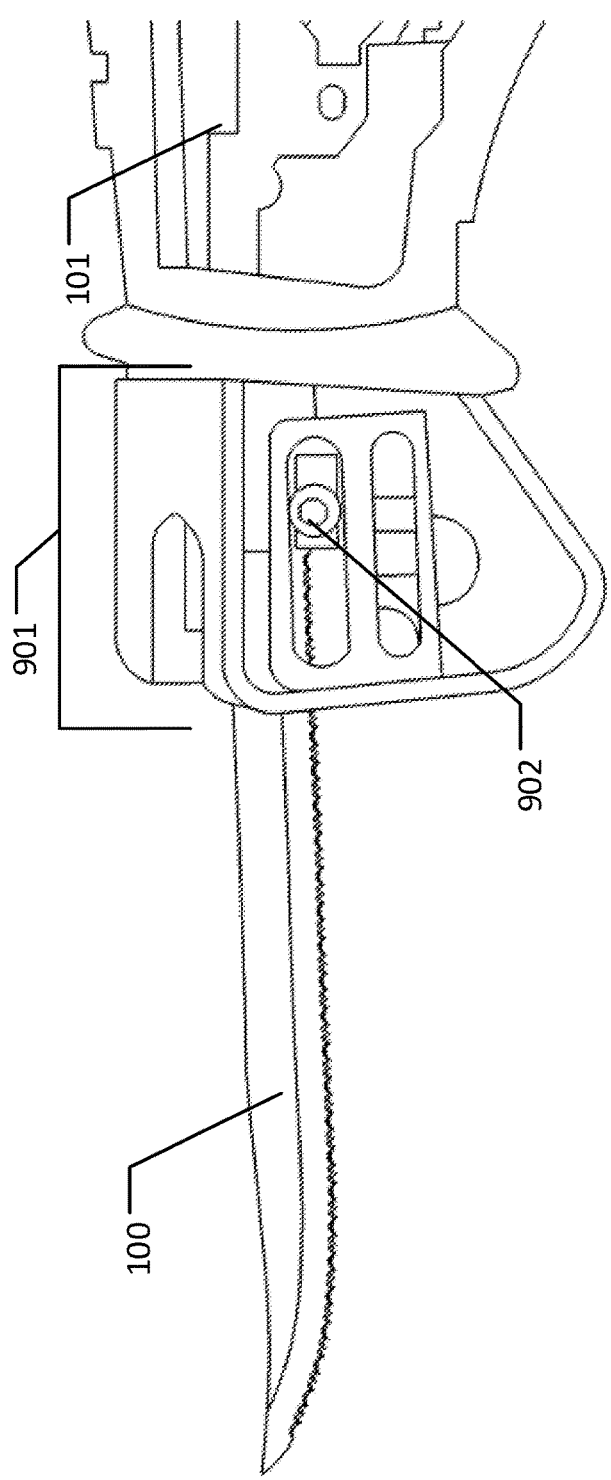
FIG. 9 illustrates how a blade is attached to a reciprocating saw.

FIG. 9 illustrates how blade 100 is attached to reciprocating saw 101. Some of the main components of reciprocating saw 101 can include but is not limited to a shoe 901, and a quick-release mechanism 902. As an example embodiment, quick-release mechanism 902 on reciprocating saw 101 can comprise a pin, which can be mateable with orifice 211 of blade 100. Blade 100 can attach to reciprocating saw 101 by inserting blade 100 into the slot on shoe 901. Once inserted, orifice 211 on blade 100 can be connected with quick-release mechanism 902.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A reciprocating saw blade for preparing fish comprising a blade attachable to a reciprocating blade, wherein said blade comprising
   a tip;
   a spine at one side of said blade, wherein said spine comprises a concave form from said tip up to the middle side edge section of said blade and forming a straight edge from the middle section up to the rear side edge section of said blade;
   a cutting edge having a continuous set of serrations formed by a plurality of teeth, said cutting edge comprising a grind that divides said spine and said cutting edge, further wherein said grind tapers from the middle section of said blade to said cutting edge; and
   a heel at the rear end of said cutting edge; and
   a wing at the rear end of said blade having an orifice and
   a prong, said orifice compatible to a quick-release mechanism of said reciprocating blade.

2. The reciprocating saw blade of claim 1 wherein each of said valleys can separate each of said tooth, such that every three of said tooth can be in between a pair of wide valleys while each of said tooth that is within said pair of wide valleys can be separated by a narrow valley.

3. The reciprocating saw blade of claim 2 wherein the tip of said plurality of teeth are pointed upwards.

4. The reciprocating saw blade of claim 1 wherein the ratio of the length from said tip to said prong to the length of said wing is 1:9.16.

5. The reciprocating saw blade of claim 4 wherein the ratio of the length of said blade from said tip to said first sink point to the length of said blade to the tip of said prong is 1:0.91.

6. The reciprocating saw blade of claim 4 wherein the ratio of the length of said blade from said tip to said first sink point to the length of said blade to the tip of said prong is 1:0.93.

7. The reciprocating saw blade of claim 4 wherein the length of said wing from said heel up to the rear end of said prong is 0.94 inches.

8. The reciprocating saw blade of claim 4 wherein the length of said wing from said heel up to said first sink point is 1.00 inch while the length from said first sink point up to the tip of said prong can be 0.90 inches.

9. The reciprocating saw blade of claim 1 wherein the ratio of the length from said tip to said prong to the length of said wing is 1:5.05.

10. The reciprocating saw blade of claim 1 wherein the ratio of the length from said tip to said prong to the length of said wing is 1:6.71.

11. The reciprocating saw blade of claim 1 wherein said wings further comprise

- a first wing edge that connects at the rear end of said spine, said first wing edge having
  - a first sink point that forms a slight drop from the straight edge formed from said spine and said first wing edge, wherein said first wing edge forms a straight edge from the rear end of said spine towards said first sink point;
  - a second sink point, wherein said first wing edge forms a slanted line towards said second sink point; and
  - a perpendicular straight line that is formed from said second sink point, further wherein said perpendicular straight line connects said second sink point with said prong; and
- a second wing edge that connects to said heel of said cutting edge.

12. The reciprocating saw blade of claim 1 wherein the radius of said orifice is 0.06 inches.

13. The reciprocating saw blade of claim 1 wherein the ratio of the height of said tooth from said grind up to the tip of said tooth to the height of said tooth from the base of said tooth up to the tip of said tooth is 1:0.51.

14. The reciprocating saw blade of claim 1 wherein the width of said tooth is 0.06 inches.

15. The reciprocating saw blade of claim 1 wherein the pitch at the base of each tooth of said plurality of teeth is 8°.

* * * * *